United States Patent
Knepp

[11] Patent Number: 6,009,656
[45] Date of Patent: Jan. 4, 2000

[54] AUTOMATIC JIGGING DEVICE FOR A FISHING ROD

[76] Inventor: Wesley James Knepp, R.D. #1 Box 33, West Decatur, Pa. 16878

[21] Appl. No.: 08/999,344

[22] Filed: Dec. 29, 1997

[51] Int. Cl.⁷ .................................................. A01K 87/00
[52] U.S. Cl. ............................................. 43/26.1; 43/19.2
[58] Field of Search ................................... 43/19.2, 21.2, 43/26.1

[56] References Cited

U.S. PATENT DOCUMENTS

| | | | |
|---|---|---|---|
| 2,713,741 | 7/1955 | Gnagy | 43/21.2 |
| 3,058,251 | 10/1962 | Brooks | 43/21.2 |
| 3,691,668 | 9/1972 | Strebig | 43/19.2 |
| 3,704,957 | 12/1972 | Petroff | 408/129 |
| 4,251,939 | 2/1981 | Tiede . | |
| 4,660,317 | 4/1987 | Evans | 43/19.2 |
| 4,779,371 | 10/1988 | Braud | 43/19.2 |
| 4,916,847 | 4/1990 | Rusgo | 43/19.2 |
| 4,951,411 | 8/1990 | Ecker | 43/19.2 |
| 5,056,255 | 10/1991 | Campbell | 43/19.2 |
| 5,119,580 | 6/1992 | Schulte et al. . | |
| 5,437,121 | 8/1995 | Chacon et al. . | |
| 5,461,817 | 10/1995 | Flood | 43/19.2 |
| 5,540,010 | 7/1996 | Aragona . | |

*Primary Examiner*—Jack W. Lavinder
*Attorney, Agent, or Firm*—Michael I. Kroll

[57] ABSTRACT

An automatic jigging device (10) for a fishing rod (12) comprising a base support (14) having a plurality of anchor holes (15), whereby the base support (14) is adapted to be stably oriented and secured on a surface via the anchor holes (15). A holder (16) receives a handle (18) of the fishing rod (12). An assembly (20) is for pivotally connecting the holder (16) within the base support (14). A plurality of elliptical cams (22) are provided. An assemblage (24) is for pivotally attaching one of the elliptical cams (22) off center within the base support (14) in a removable manner. A facility (26) is for rotating the pivotally attaching assemblage (24), so that the elliptical cam (22) will make contact with the holder (16). The holder (16) with the handle (18) of the fishing rod (12) will be lifted and lowered to cause the fishing rod (12) to go into a jigging motion. The automatic jigging device (10) can also contain a holder (16a) being a cylindrical sleeve (38a) bent at an angle having a closed end (40a), so that the handle (18) of the fishing rod (12) can fit therein. One of the elliptical cams (22) moves the bent cylindrical sleeve (38a) and the handle (18) of the fishing rod (12) back and forth on a horizontal plane, when the base support (14) is mounted on its side.

17 Claims, 9 Drawing Sheets

| | 15 DEGREES | 30 DEGREES | 60 DEGREES |
|---|---|---|---|
| ARC OF MOVEMENT | "A" | "B" | "C" |

AUTOMATIC JIGGING DEVICE FOR A FISHING ROD

BACKGROUND OF THE INVENTION

1. Field of the Invention

The instant invention relates generally to fishing line jiggler apparatuses and more specifically it relates to an automatic jigging device for a fishing rod. The automatic jigging device for a fishing rod consists of a pivotally mounted holder for a handle of the fishing rod in a base support that is lifted and lowered in a jigging motion by an elliptical cam mounted off center to a drive shaft of a motor.

2. Description of the Prior Art

Numerous fishing line jiggler apparatuses have been provided in prior art. For example, U.S. Pat. Nos. 4,251,939 to Tiede; 5,119,580 to Schulte et al.; 5,437,121 to Chacon, Jr., et al. and 5,540,010 to Aragona all are illustrative of such prior art. While these units may be suitable for the particular purpose to which they address, they would not be as suitable for the purposes of the present invention as heretofore described.

TIEDE, CLAIR L.

PROGRAMMABLE FISH LURE JIGGLER

U.S. Pat. No. 4,251,939

A programmable fish line jiggler having a rod holding the line and a rotatable member for moving the rod up and down and thus move the bait on the end of the line. The rotatable member has movable contacts thereon which engage the rod for inducing the up and down movement of the rod, and the contacts can be positioned in selected positions on the member, so that the actual jigging action can be selected by the fisherman.

SCHULTE, TIMOTHY M.

SCHULTE, RICHARD S.

DEVICE FOR JIGGING A FISHING POLE

U.S. Pat. No. 5,119,580

A fishing pole holder is pivotally mounted on the upper end portion of an upright tubular housing to rock upwardly and downwardly about a horizontal axis. A battery-operated motor is contained in the housing and is operable to rotate a cam having a plurality of angularly spaced lobes which act against a cam follower on the holder to rock the latter upwardly and downwardly. With this arrangement, a fishing pole supported in the holder may be automatically moved upwardly and downwardly in order to jig a lure in the water.

CHACON, JR., EUGENE O.

DAVID, RODNEY D.

DEVICE FOR SUPPORTING A FISHING ROD AND FOR PROVIDING A PERIODIC LIFTING MOTION TO THE ROD TO EFFECT JIGGING

U.S. Pat. No. 5,437,121

A device for supporting a fishing rod and for providing a periodic lifting motion to the rod to effect jigging comprising, of a box-like housing in a generally rectangular configuration with a lower bottom wall, with front, rear and side edges, upstanding rectangular front and rear walls parallel with each other and extending upwardly from the front and rear edges of the bottom wall and with rectangular side walls parallel with each other and extending upwardly from the side edges of the bottom wall and coupled at their vertical side edges to the vertical edges of the front and rear walls. A rectangular top wall is removably coupled at its periphery to the upper edges of the front, rear and side walls. Screws are to removably couple the top wall from the upper edges of the front, rear and side walls. A fishing rod holder is secured to one side wall of the housing above the central plane thereof and adjacent to the back wall. The holder has a lower planar surface in an angular orientation with respect to the top and bottom walls for supporting a central extent of a fishing rod at an angle with its lower most end on the ground. The holder also has a vertically extending wall located outwardly from the supporting side wall of the housing. A motor is mounted within the housing with a battery for providing a source of potential to drive the motor. A power switch is located within the housing with a toggle extending exteriorly of the housing through the adjacent side wall thereof opposite from the holder. The toggle is movable between an on position wherein power is provided to the motor and an off position where power to the motor is stopped. A speed switch is mounted in the side wall of the housing with the switch. Electrical wires are for coupling the motor, battery and switch. A drive rod extending vertically from the motor through the side wall is for supporting the holder. The drive rod having an L-shaped member with a long vertical leg is coupled at a first interior end to the rod of the motor and with a second exterior end extending horizontally at a right angle from the first end. The L-shaped member is adapted to rotate with the activation of the motor and rotation of the drive shaft. The L-shaped member is adapted to periodically contact the fishing rod at a location above and forwardly of the holder to effect its jigging.

ARAGONA, JAMES T.

FISHING ROD JIGGING APPARATUS

U.S. Pat. No. 5,540,010

A fishing rod jigging apparatus includes a base assembly which has a longitudinal axis. An oscillating driving assembly is supported on the base assembly at a first position along the longitudinal axis. A hinge assembly is supported on the base assembly at a second position along the longitudinal axis. The hinge assembly is spaced apart by a predetermined distance from the oscillating driving assembly. A handle-holder assembly is connected to the hinge assembly. The handle-holder assembly is adapted for rotational motion around the hinge assembly limited in a bottom direction by the base assembly. A linkage assembly is connected between the oscillating driving assembly and the handle-holder assembly for imparting an oscillating motion to the handle-holder assembly. The oscillating driving assembly includes a drive shaft and a drive wheel assembly connected to the drive shaft. The drive wheel assembly includes a center driven wheel connected to the drive shaft and an eccentric drive element located off-center on the center-driven wheel. The link is pivotally connected at a first end to the eccentric drive element, and a link receiver is connected to the handle-holder assembly. The link is also pivotally connected to the link receiver. The handle-holder assembly includes a canted end adapted to permit the handle-holder assembly to be oriented at a canted angle with respect to the base assembly. The handle-holder assembly includes a hollow cylindrical chamber adapted to receive a handle of a fishing rod.

SUMMARY OF THE INVENTION

A primary object of the present invention is to provide an automatic jigging device for a fishing rod that will overcome the shortcomings of the prior art devices.

Another object is to provide an automatic jigging device for a fishing rod, in which a pivotally mounted holder for a handle of the fishing rod in a base support, is lifted and lowered in a jigging motion in response to rotation of an elliptical cam that is mounted off center to a drive shaft of a motor.

An additional object is to provide an automatic jigging device for a fishing rod, in which a plurality of different sized elliptical cams can be mounted one at a time in a removable manner off center to the drive shaft of the motor, so as to vary the length of the jigging motion to the holder for the handle of the fishing rod, for different types of fishing conditions.

A further object is to provide an automatic jigging device for a fishing rod that is simple and easy to use.

A still further object is to provide an automatic jigging device for a fishing rod that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DESCRIPTION OF THE PREFERRED EMBODIMENTS

Figure 1:
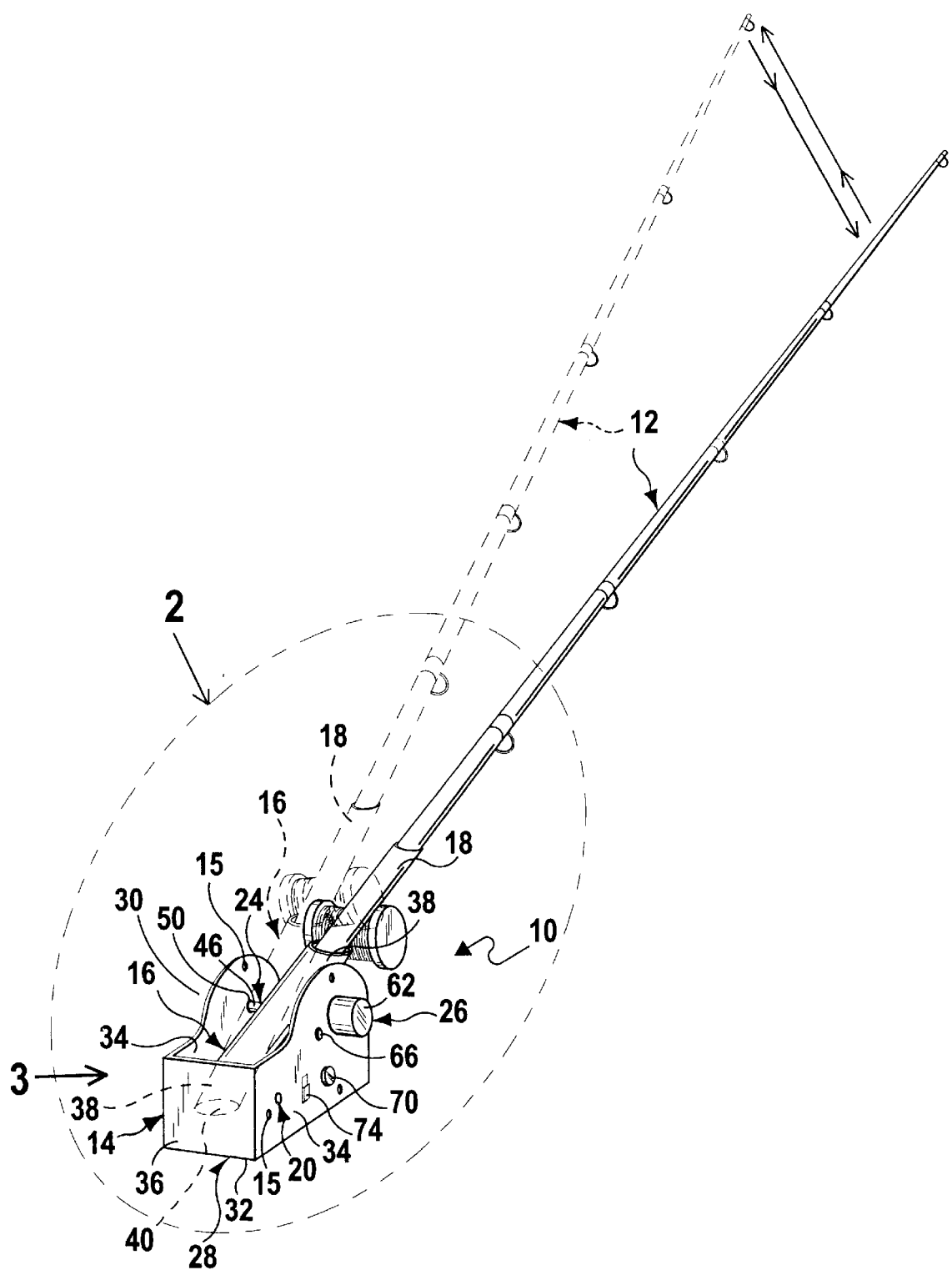
FIG. 1 is a perspective view of the present invention.

Turning now descriptively to the drawings, in which similar reference characters denote similar elements throughout the several views, FIGS. 1 through 9 illustrate an automatic jigging device 10, of the present invention. With regard to the reference numerals used, the following numbering is used throughout the various drawing figures.

10 automatic jigging device
12 fishing rod
14 base support of 10
15 anchor hole in 14
16 holder of 10
16a modified holder of 10
18 handle of 12
20 pivotally connecting assembly of 10
22 elliptical cam of 10
24 pivotally attaching assemblage of 10
26 rotating facility of 10
28 box-shaped housing for 14
30 open top of 28
32 bottom wall of 28
34 side wall of 28
36 end wall of 28
38 cylindrical sleeve for 16
38a bent cylindrical sleeve for 16a
40 closed end of 38
40a closed end of 38a
42 cylindrical pivot bar of 20
44 annular bearing of 20
46 drive shaft of 24
48 keyed flat portion on 46
50 circular opening in 14
52 off center aperture in 22
54 keyed flat portion of 52
56 retainer washer of 24
58 hole in 56
60 keyed flat portion of 58
62 electric motor of 26
64 power source of 26
66 push button circuit breaker of 26
68 speed control circuit of 26
70 control knob of 68
72 intermittent delay circuit of 26
74 slide switch of 72

The automatic jigging device 10 is for a fishing rod 12 and comprises a base support 14 having a plurality of anchor holes 15, whereby the base support 14 is adapted to be stably oriented and secured onto a surface via the anchor holes 15. A holder 16 receives a handle 18 of the fishing rod 12. An assembly 20 is for pivotally connecting the holder 16 within the base support 14. A plurality of elliptical cams 22 are provided. An assemblage 24 is for pivotally attaching one of the elliptical cams 22 off center within the base support 14 in a removable manner. A facility 26 is for rotating the pivotally attaching assemblage 24, so that the elliptical cam 22 will make contact with the holder 16. The holder 16 with the handle 18 of the fishing rod 12 will be lifted and lowered, to cause the fishing rod 12 to go into a jigging motion.

The base support 14 is a generally box-shaped housing 28 having an open top 30. The generally box-shaped housing 28 consists of a bottom wall 32, a pair of opposed side walls 34 extend upwardly from the bottom wall 32 and a pair of opposed end walls 36 extend upwardly from the bottom wall 32.

The holder 16 is a cylindrical sleeve 28 having a closed end 40, so that the handle 18 of the fishing rod 12 can fit therein. The pivotally connecting assembly 20 includes a cylindrical pivot bar 42 which extends through the base support 14 and the holder 16. A pair of annular bearings 44 are provided. Each annular bearing 44 is on one end of the cylindrical pivot bar 42 in the base support 14.

Figures 7, 8:
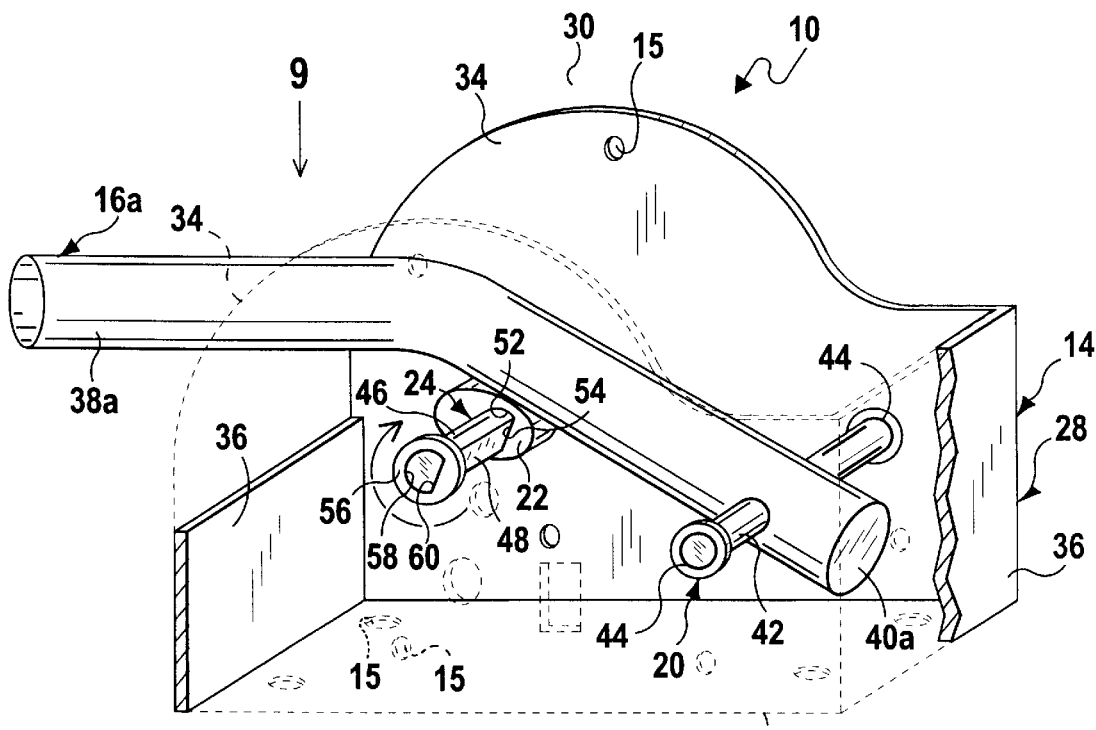
FIG. 7 is a reference chart showing various angle arc movements of the holder caused by the different sized elliptical cams used in FIGS. 4 to 6.
FIG. 8 is a perspective view of the present invention similar to FIG. 6, showing a modified holder for the handle of the fishing rod bent at an angle.

The elliptical cams 22 are of different sizes, so that each elliptical cam 22 will change the arc movement of the holder 16, to vary the jigging motion of the fishing rod 12. For example, as shown in FIG. 7, arc movement "A" equals fifteen degrees, arc movement "B" equals thirty degrees and arc movement "C" equals sixty degrees. The pivotally attaching assemblage 24 consists of a drive shaft 46 having a keyed flat portion 48 lengthwise therealong, whereby the drive shaft 46 extends through circular openings 50 in the base support 14. Each of the elliptical cams 22 have an off center aperture 52 with a keyed flat portion 54, so as to fit onto the drive shaft 46 within the base support 14. A retainer washer 56 has a hole 58 with a keyed flat portion 60, so as to fit onto one end of the drive shaft 46.

The rotating facility 26 is an electric motor 62 electrically connected to a power source 64, such as a 12 volt battery or transformer. A push button circuit breaker 66 is electrically connected between the electric motor 62 and the power source 64, so as to prevent the electric motor 62 from burning out.

Figure 1A:
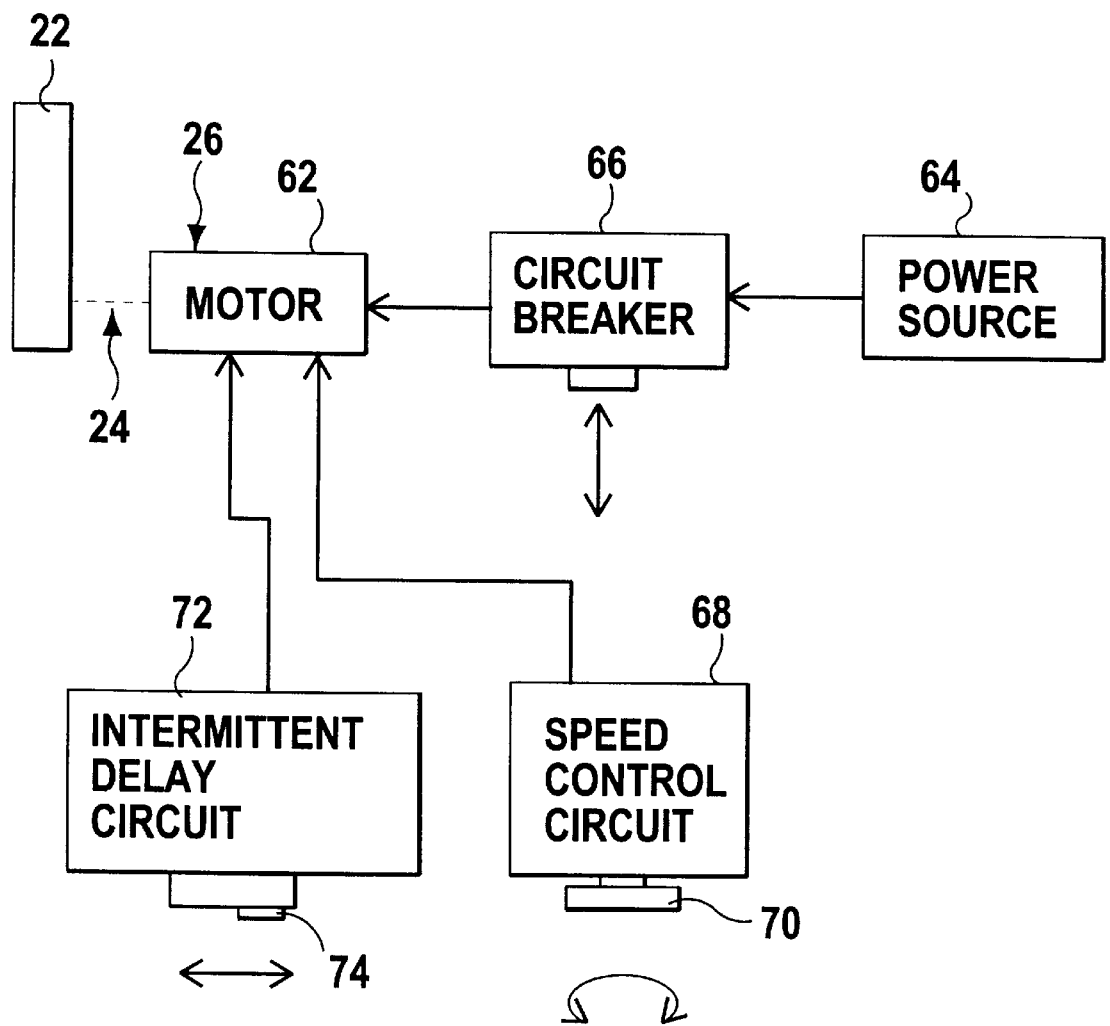
FIG. 1A is a block diagram of the electrical system of the present invention.
Figure 2:
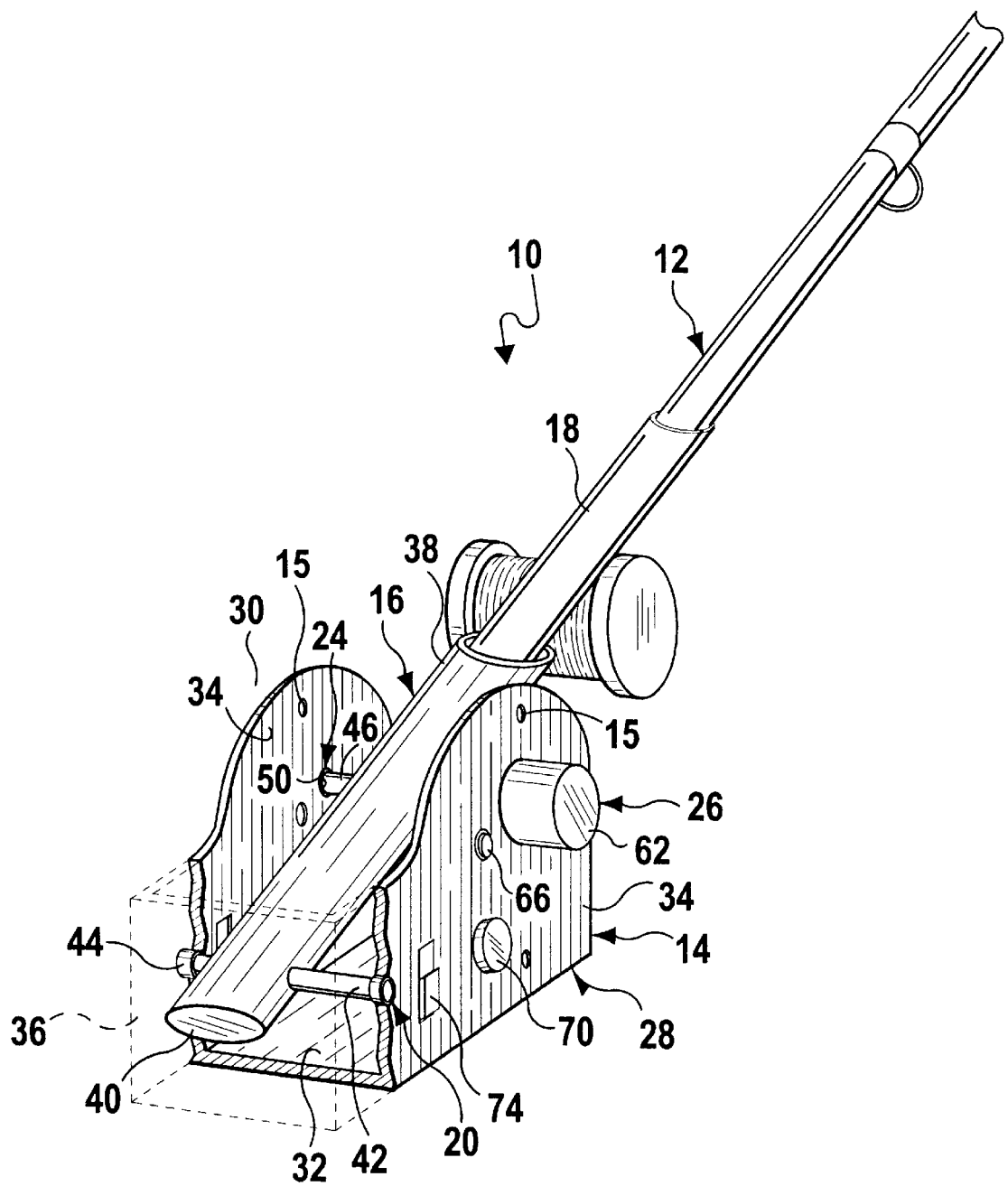
FIG. 2 is an enlarged perspective view of an area indicated by arrow 2 in FIG. 1, with the base support broken away to see the holder for the handle of the fishing rod mounted on the pivot bar.
Figure 3:
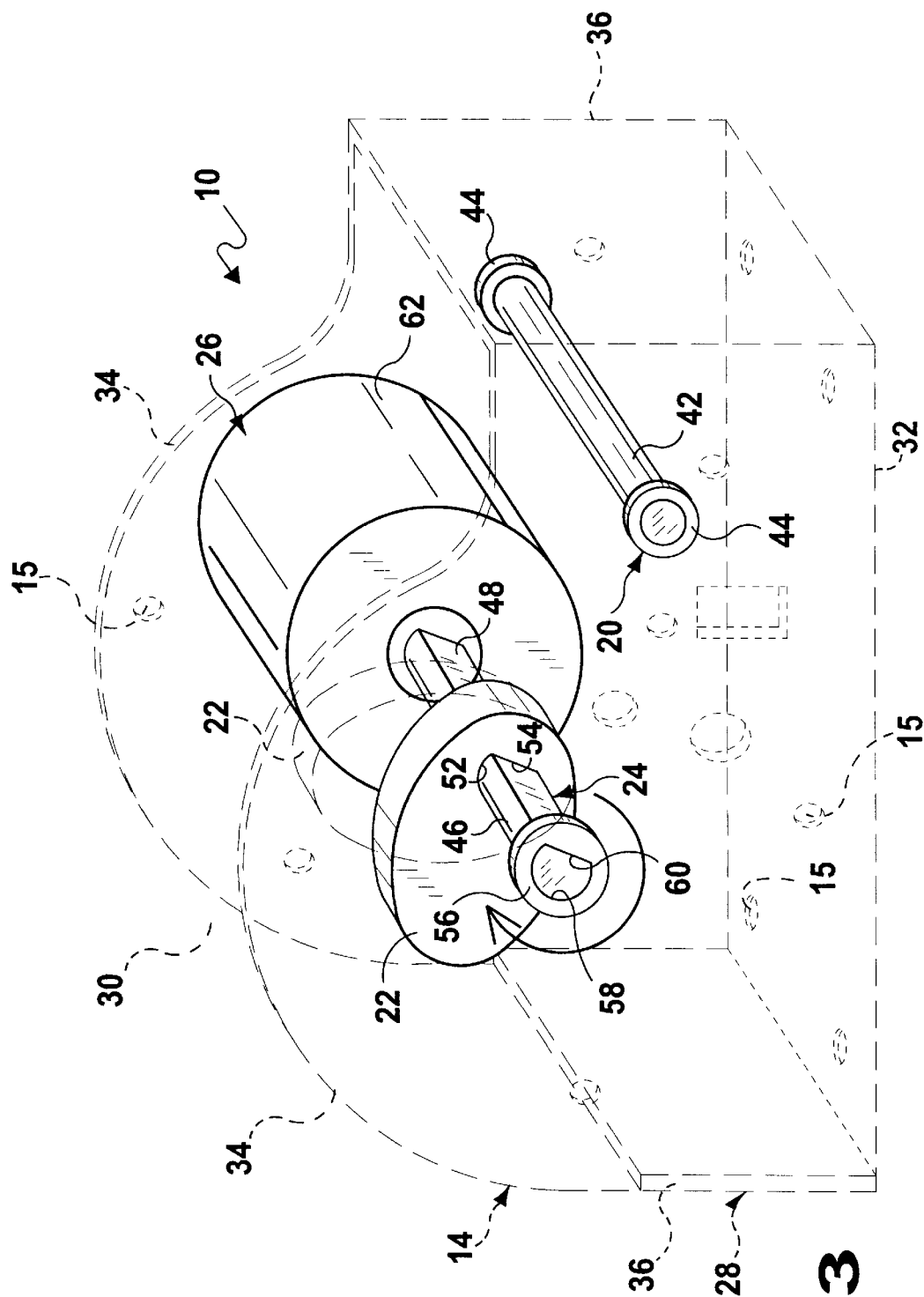
FIG. 3 is a perspective view taken in the direction of arrow 3 in FIG. 1, showing the base support in phantom, an elliptical cam mounted off center to the drive shaft of the motor and the pivot bar for the holder.
Figure 4:
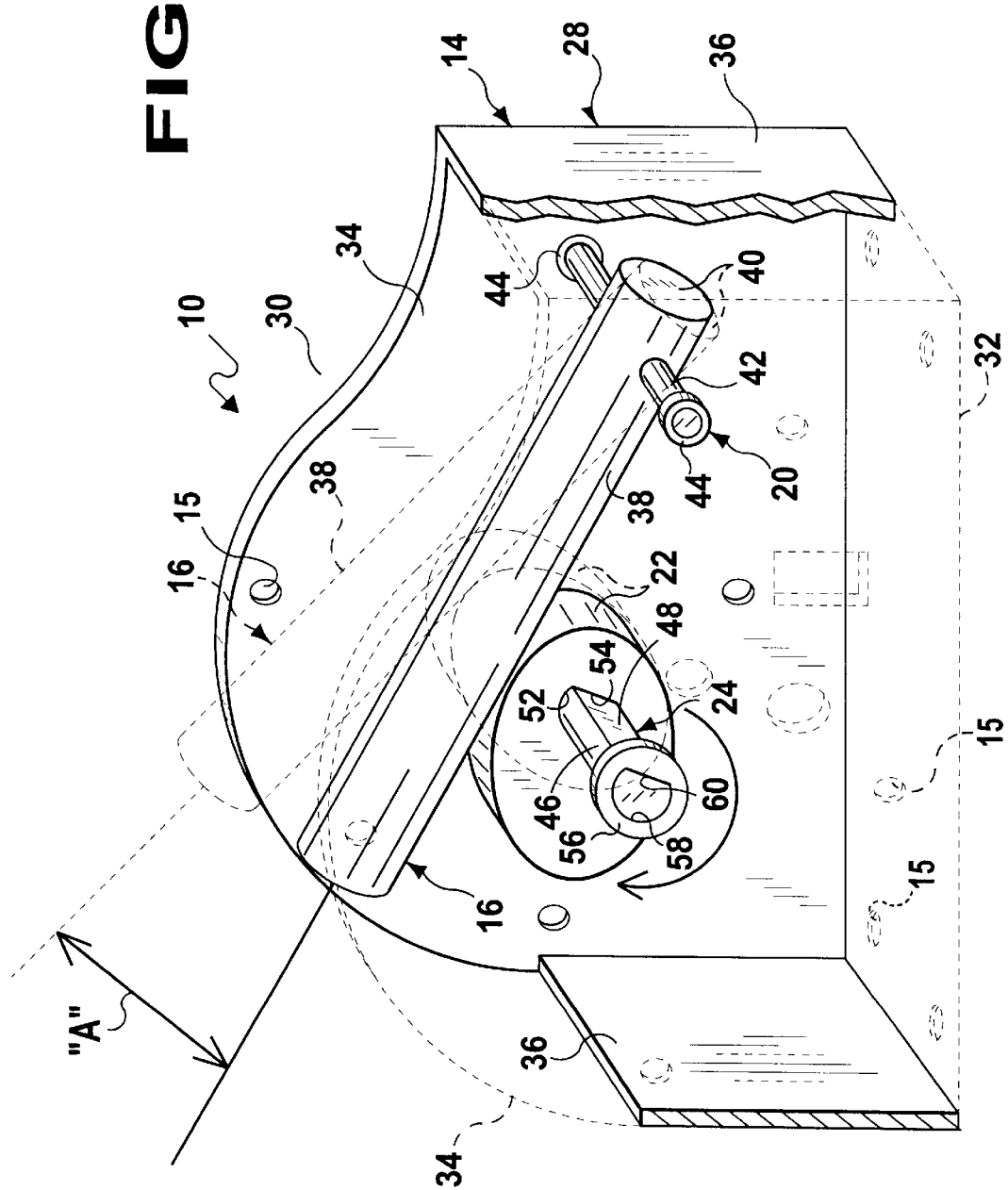
FIG. 4 is a perspective view similar to FIG. 3, showing the base support broken away and partly in phantom, with a small sized elliptical cam mounted off center to the drive shaft and the holder in its lowest and highest positions.
Figure 5:
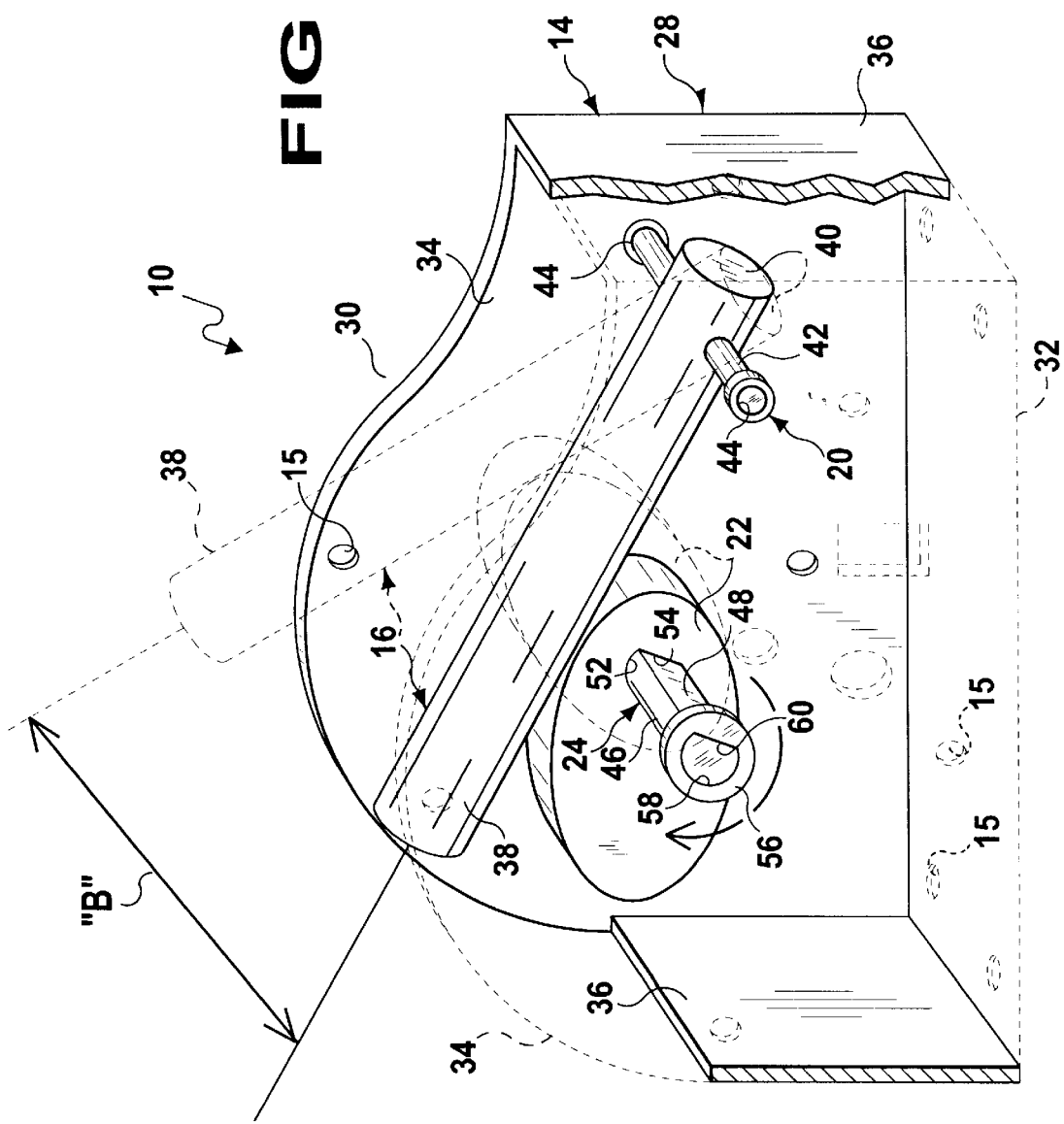
FIG. 5 is a perspective view similar to FIG. 4, showing a medium sized elliptical cam mounted off center to the drive shaft and the holder in its lowest and highest positions.
Figure 6:
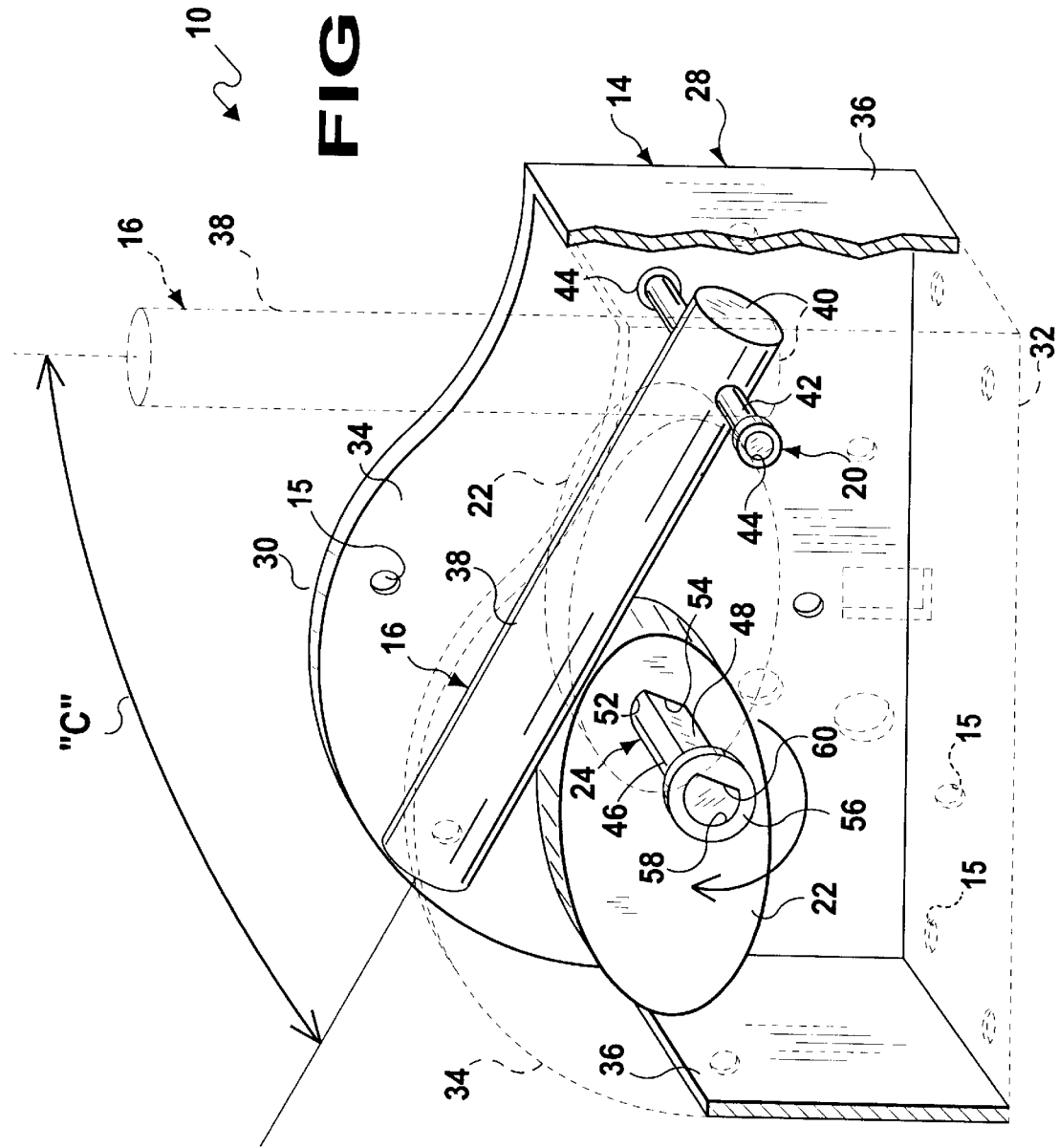
FIG. 6 is a perspective view similar to FIG. 5, showing a large sized elliptical cam mounted off center to the drive shaft and the holder in its lowest and highest positions.

The rotating facility 26 further includes a speed control circuit 68 operated by a control knob 70, electrically connected to the electric motor 62, so as to vary the speed of the electric motor 62 and control rotation of any one of the elliptical cams 22. An intermittent delay circuit 72 operated by a slide switch 74, is electrically connected to the electric motor 62, so as to intermittently delay the operation of the electric motor 62 to replace any one of the elliptical cams 22 (see FIG. 1A). The rotating facility 26 can be mounted from either side of the base support 14. This makes the base support 14 more versatile and allows the holder 16 to be used on either the right or left side of a boat.

Figure 9:
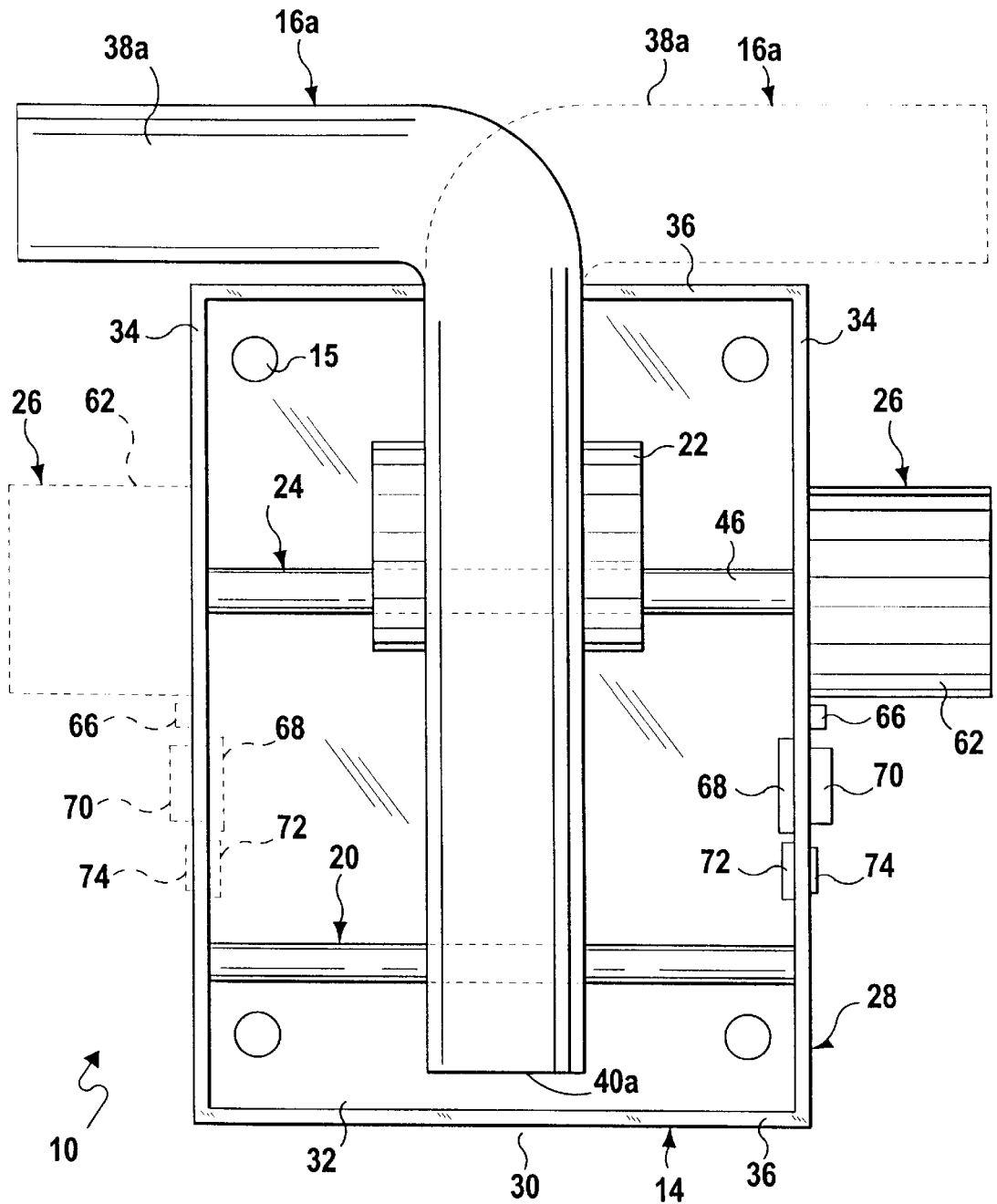
FIG. 9 is a top plan view taken in the direction of arrow 9 in FIG. 8, showing that the rotating facility can be mounted from either side of the base support.

FIGS. 8 and 9 show a holder 16a being a cylindrical sleeve 38a bent at an angle, having a closed end 40a, so that the handle 18 of the fishing rod 12 can fit therein. One of the elliptical cams 22 is utilized to move the bent cylindrical sleeve 38a and the handle 18 of the fishing rod 12 back and forth on a horizontal plane, when the base support 14 is mounted on its side. This allows the holder 16a to be used out the side of a boat when trolling. The holder 16a does not actually jig, but pulls the fishing rod 12 back and forth, imparting a teasing action to the lure that is very enticing to fish.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An automatic jigging device for a fishing rod comprising:
    a) a base support having a plurality of anchor holes, whereby said base support is adapted to be stably oriented and secured onto a surface via said anchor holes;
    b) a holder to receive a handle of the fishing rod;
    c) means for pivotally connecting said holder within said base support;
    d) a plurality of elliptical cams;
    e) means for pivotally attaching one of said elliptical cams off center within said base support in a removable manner; and
    f) means for rotating said pivotally attaching means, so that said elliptical cam will make contact with said holder, and said holder with the handle of the fishing rod will be lifted and lowered to cause the fishing rod to go into a jigging motion, wherein said rotating means is an electric motor electrically connected to a power source and further includes an intermittent delay circuit operated by a slide switch, electrically connected to said electric motor, so as to intermittently delay the operation of said electric motor to replace any one of said elliptical cams.

2. An automatic jigging device for a fishing rod as recited in claim 1, wherein said base support is a generally box-shaped housing having an open top.

3. An automatic jigging device for a fishing rod as recited in claim 2, wherein said generally box-shaped housing includes:
    a) a bottom wall;
    b) a pair of opposed side walls extending upwardly from said bottom wall; and
    c) a pair of opposed end walls extending upwardly from said bottom wall.

4. An automatic jigging device for a fishing rod as recited in claim 3, wherein said holder is a cylindrical sleeve having a closed end, so that the handle of the fishing rod can fit therein.

5. An automatic jigging device for a fishing rod as recited in claim 4, wherein said pivotally connecting means includes:
    a) a cylindrical pivot bar which extends through said base support and said holder; and
    b) a pair of annular bearings, whereby each said annular bearing is on one end of said cylindrical pivot bar in said base support.

6. An automatic jigging device for a fishing rod as recited in claim 5, wherein said elliptical cams are of different sizes, so that each said elliptical cam will change the arc movement of said holder to vary the jigging motion of the fishing rod.

7. An automatic jigging device for a fishing rod as recited in claim 6, wherein said pivotally attaching means includes:
 a) a drive shaft having a keyed flat portion lengthwise therealong, whereby said drive shaft extends through circular openings in said base support;
 b) each of said elliptical cams having an off center aperture with a keyed flat portion, so as to fit onto said drive shaft within said base support; and
 c) a retainer washer having a hole with a keyed flat portion, so as to fit onto one end of said drive shaft.

8. An automatic jigging device for a fishing rod as recited in claim 7, wherein said rotating means further includes a push button circuit breaker electrically connected between said electric motor and said power source, so as to prevent said electric motor from burning out.

9. An automatic jigging device for a fishing rod as recited in claim 8, wherein said rotating means further includes a speed control circuit operated by a control knob, electrically connected to said electric motor, so as to vary the speed of said electric motor and control rotation of any one of said elliptical cams.

10. An automatic jigging device for a fishing rod as recited in claim 9, wherein said holder is a cylindrical sleeve bent at an angle having a closed end, so that the handle of the fishing rod can fit therein, with one of said elliptical cams utilized to move said bent cylindrical sleeve and the handle of the fishing rod back and forth on a horizontal plane, when said base support is mounted on its side.

11. An automatic jigging device for a fishing rod as recited in claim 1, wherein said holder is a cylindrical sleeve having a closed end, so that the handle of the fishing rod can fit therein.

12. An automatic jigging device for a fishing rod as recited in claim 1, wherein said pivotally connecting means includes:
 a) a cylindrical pivot bar which extends through said base support and said holder; and
 b) a pair of annular bearings, whereby each said annular bearing is on one end of said cylindrical pivot bar in said base support.

13. An automatic jigging device for a fishing rod as recited in claim 1, wherein said elliptical cams are of different sizes, so that each said elliptical cam will change the arc movement of said holder to vary the jigging motion of the fishing rod.

14. An automatic jigging device for a fishing rod as recited in claim 1, wherein said pivotally attaching means includes:
 a) a drive shaft having a keyed flat portion lengthwise therealong, whereby said drive shaft extends through circular openings in said base support;
 b) each of said elliptical cams having an off center aperture with a keyed flat portion, so as to fit onto said drive shaft within said base support; and
 c) a retainer washer having a hole with a keyed flat portion, so as to fit onto one end of said drive shaft.

15. An automatic jigging device for a fishing rod as recited in claim 1, wherein said rotating means further includes a push button circuit breaker electrically connected between said electric motor and said power source, so as to prevent said electric motor from burning out.

16. An automatic jigging device for a fishing rod as recited in claim 1, wherein said rotating means further includes a speed control circuit operated by a control knob, electrically connected to said electric motor, so as to vary the speed of said electric motor and control rotation of any one of said elliptical cams.

17. An automatic jigging device for a fishing rod as recited in claim 1, wherein said holder is a cylindrical sleeve bent at an angle having a closed end, so that the handle of the fishing rod can fit therein, with one of said elliptical cams utilized to move said bent cylindrical sleeve and the handle of the fishing rod back and forth on a horizontal plane, when said base support is mounted on its side.

\* \* \* \* \*